US006327056B1

(12) United States Patent
Tsai et al.

(10) Patent No.: US 6,327,056 B1
(45) Date of Patent: Dec. 4, 2001

(54) IMAGE SCANNER WITH IMAGE CORRECTION FUNCTION

(75) Inventors: Chi-pin Tsai; Hung-chou Chiu, both of Hsinchu (TW)

(73) Assignee: Microtek International Inc., Hsinchu (TW)

( * ) Notice: Subject to any disclaimer, the term of this patent is extended or adjusted under 35 U.S.C. 154(b) by 0 days.

(21) Appl. No.: 09/401,265

(22) Filed: Sep. 23, 1999

(30) Foreign Application Priority Data

Jan. 29, 1999 (TW) .................................................. 8810465

(51) Int. Cl.⁷ ....................................................... H04N 1/04
(52) U.S. Cl. ............................ 358/474; 350/219; 250/201
(58) Field of Search ................................... 358/474, 461, 358/464, 482, 483, 486, 493, 294, 280, 475; 350/219, 6.9; 250/201, 235, 334

(56) References Cited

U.S. PATENT DOCUMENTS

| 4,680,644 | * | 7/1987 | Shirato | 358/294 |
| 4,923,263 | * | 8/1990 | Johnson | 350/6.9 |
| 5,266,805 | * | 11/1993 | Edgar | 250/330 |
| 5,272,548 | * | 12/1993 | Kawai | 358/482 |
| 5,920,680 | * | 6/1999 | Inoue | 395/101 |
| 5,929,979 | * | 6/1999 | Okino | 355/60 |
| 6,005,682 | * | 12/1999 | Wu | 358/474 |

FOREIGN PATENT DOCUMENTS

403181828A * 8/1991 (JP) ....................................... 356/408

* cited by examiner

*Primary Examiner*—Jerome Grant, II
*Assistant Examiner*—Negussie Worku
(74) *Attorney, Agent, or Firm*—Bacon & Thomas

(57) ABSTRACT

An image scanner with an image correction function generates a primary image and an auxiliary image of a document. The image scanner includes an image sensing module, a lens module, a scanning platform, a primary light source and an auxiliary light source. The primary light source illuminates the document from a first optical angle and the auxiliary light source illuminates the document from a second optical angle. During alternate illumination by the primary and auxiliary light sources, the scanner respectively generates two images for each document, one of which is a primary image and the other of which is an auxiliary image. The auxiliary image, which includes information concerning damage to the document, is used to correct the primary image, either transmitting the images to a host for further processing, or by processing the images within the scanner.

18 Claims, 4 Drawing Sheets

IMAGE SCANNER WITH IMAGE CORRECTION FUNCTION

BACKGROUND (a) Field of the Invention

The present invention relates generally to an image scanner, more particularly, to a scanner generating both a primary image and an auxiliary image to correct the damaged image generated from a scratched document.

(b) Description of the Prior Art

At the present time, the scanning device is quite advanced. It can not only convert the original images into digital data but also correct damaged images scanned from scratched documents to produce high quality image data. For example, Applied Science Fiction Co. proposed a technology called Digital Image Correction Enhancement (ICE). The ICE technology can receive the primary image and damaged image from an image scanner and correct the primary image according the damaged image. The primary image and damaged image are generated by scanning typical film with visible light and Infrared (850 nm), respectively.

Because the damaged spots, for example scratched on film, will appear within the damaged image when scanned from the film, the ICE technology can correct the primary image according the damaged image to generate the corrected image without scratches. FIGS. 7 and 8, show the optical path for both a transparent scanner and a reflective scanner. As shown in the figures, both the transparent and reflective scanners need a light source to provide the light beams for scanning and an image sensor module to catch the image.

The ICE technology mentioned above makes use of the different optical characteristics between infrared ray (850 nm wave length) and visible light for typical film and focuses on the different penetrating character from both infrared rays and visible light. Hence, the primary image is generated at illumination of visible light and the damaged image is generated at illumination of infrared ray, respectively. However, it may lose this optical feature while working with a non-transparent document. Therefore, it is only good for typical films but not for typical reflective documents or special films like photos or film for infrared ray. Additionally, the scanning device with ICE technology should carry both visible light and infrared ray sources to generate the primary image and damaged image.

SUMMARY OF THE INVENTION

An object of the present invention is to provide an image scanner with a correcting function for both transparent and reflective documents.

Another object of the present invention is to provide an image scanner with an image correction function having only a visible light source.

A further object of the present invention is to provide an image scanner with am image correction function that reads both primary and auxilary images at the same time.

An image scanner with image correction function for generating a primary image and an auxiliary image of a document comprises a housing with a scanning platform for placing said document, a major light source to illuminate said document at a first optical angle, an auxiliary light source to illuminate said document at a second optical angle, and a scanning module to capture said primary image while said major light illuminates said document and to capture said auxiliary image while said auxiliary light illuminates said document. The present scanner further comprises a correction means for correcting a scratched image on a portion of said primary image according to said auxiliary image to enhance said primary image quality.

DETAILED DESCRIPTION OF PREFERRED EMBODIMENTS

Figure 1:
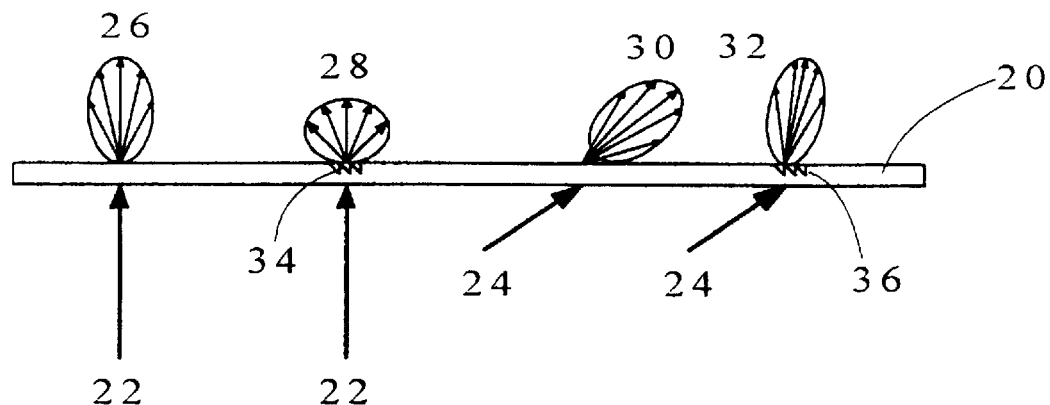
FIG.1 is an optical path showing the various penetrating conditions on a transparent document for lights from different angles.
Figure 2:
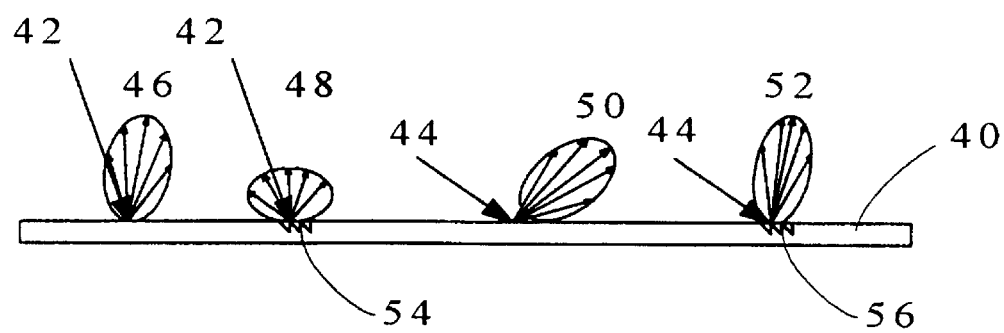
FIG. 2 is an optical path showing the various reflecting conditions on a reflective document for lights from different angles.

FIG. 1 and FIG. 2 show the optical characteristics diffusion and scattering, on a scratched document. FIG. 1 is in the transparent scanning mode and FIG. 2 is in the reflective scanning mode. Due to the same principle behind both modes, only FIG. 1 will be explained.

As shown in FIG. 1, there are 4 light beams 26, 28, 30 and 32 resulting from penetration of the transparent document 20 by a normal light source 22 and a oblique light source 24. The transparent document 20 has scratched spots 34 and 36 on its surface. It can be understood by viewing the figure that light beam 26 can penetrate document 20 and the image is projected on the image sensor (not shown) normally while light source 22 illuminates on the non-scratched area. But, when the normal light source 24 illuminates the scratched area 34, the light beam 28 can not project normally on the image sensor since the scratched area 34 will cause the light beam to diffuse or scatter. Therefore, there are some scratches on the image scanned from the document with the normal light source 24.

On the other hand, the normal image data will not be generated by the sensors while the oblique light source 24 illuminates the non-scratched area since the oblique light source 24 has a larger leaning angle, which makes the penetrating light beam 30 unable to project correctly on the sensor unit. However, due to the fact that the scratched area will cause the diffusion or scattering of the light, the light beam 32 will partially project on the sensor and generate the auxiliary (damaged) image data while the oblique light source illuminates the spot 36 of the scratched transparent document 20. So, the scratched area on the auxiliary image will be emphasized.

As a result, a higher quality image can be obtained by capturing and processing the image data generated by both the normal and oblique light sources.

Figure 3:
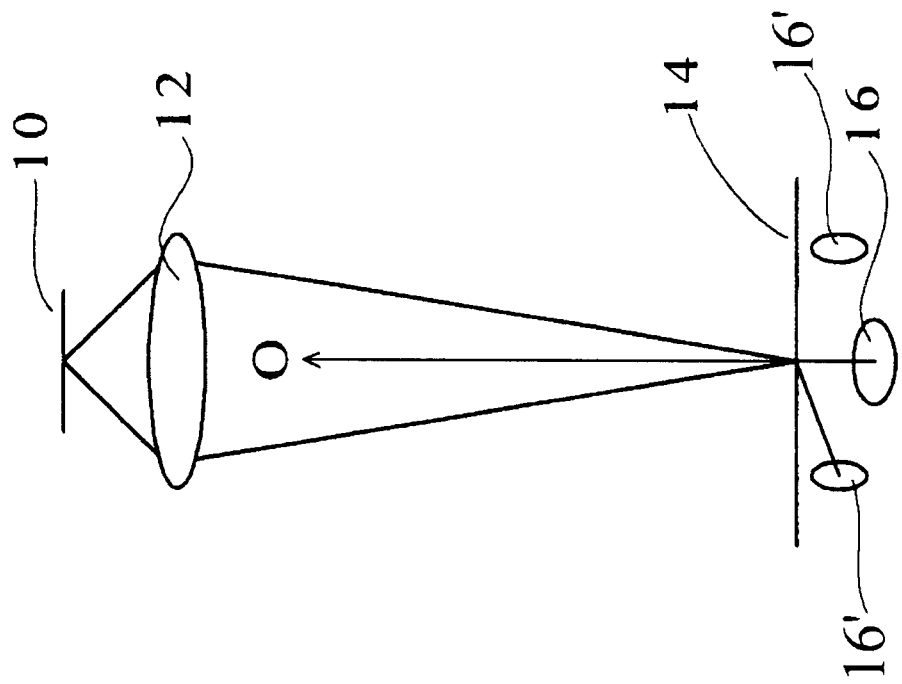
FIG. 3 is an optical path of the present invention.

FIG. 3 shows the optical diagram of the first embodiment of the present invention of an image scanner with correction function. This optical diagram can be applied to both transparent and reflective documents.

As shown in FIG. 3, the optical module of the first embodiment of present invention comprises a CCD 10, a lens 12, a scanning platform 14, a normal (primary) light source and an oblique (auxiliary) light source 16'. The document to be scanned is placed on the scanning platform 14. The primary light source 16 is disposed as in typical scanners with a first optical angle, but the auxiliary light source 16' is disposed by the side of the primary light source 16 with a second optical angle. The first optical angle is defined as the angle between the normal of the document and the illumination direction from the primary light source 16 to the document. And the second optical angle is defined as the angle between the normal of the document and the illumination direction from auxiliary light source 16' to the document. The scanner takes two steps to capture the primary image and auxiliary image. The first step is to capture the primary image with the normal light source 16, and the second step is to capture the auxiliary image with the auxiliary light source 16'. During the first step, the scanner turns on the normal light source 16 and scans the document, like film, placed on the platform in a commonly-known way to generate a primary image. Then, the scanner delivers the primary image data to the connected host. Next, in the second step, the scanner turns on the auxiliary light source 16' and scans the document on the platform in a commonly known way to generate an auxiliary image. Then, the scanner delivers the auxiliary image data to the connected host. The host pre-processes the auxiliary image data to generate a reference image with only the scratched area. Then, the host corrects the primary image according to the reference image by a correction procedure to form a higher quality image. Of course, the image processing functions can also be built into scanning device and provide the final result to the host.

Figure 4:
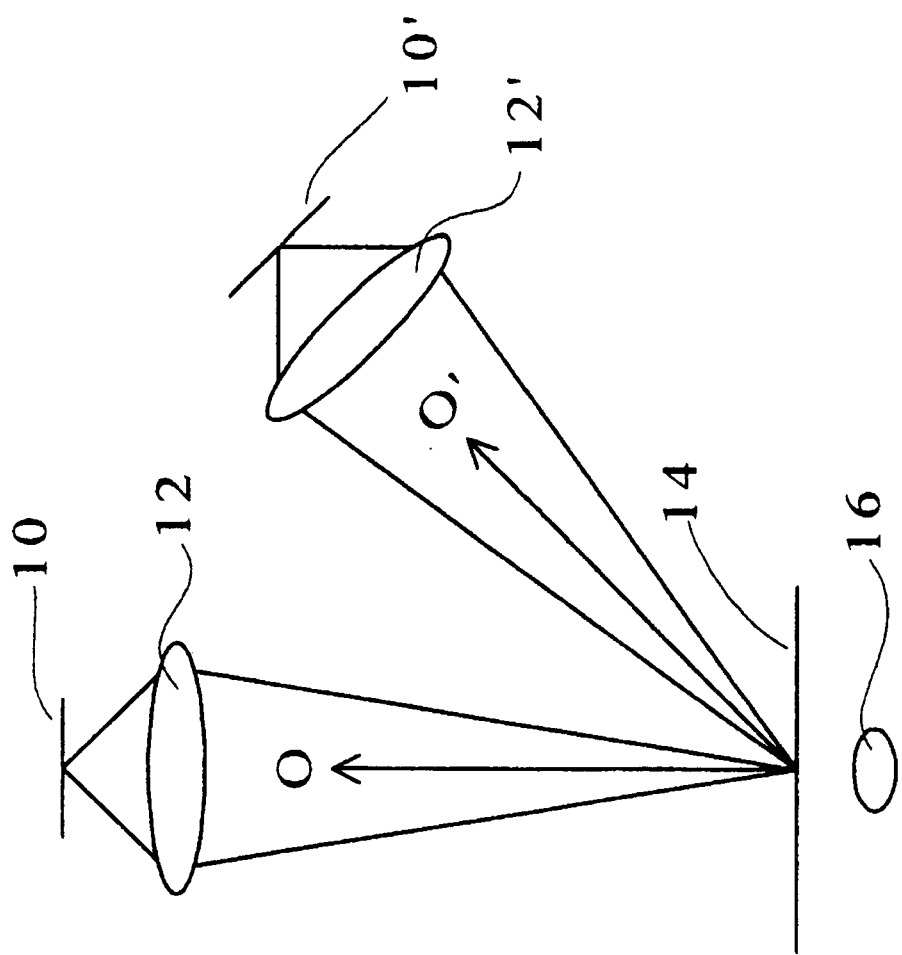
FIG. 4 is the 2nd embodiment of optical diagram of present invention.

Next, FIG. 4 it shows the optical diagram for the second embodiment of present invention. This diagram can be applied to both transparent and reflective documents.

As shown in FIG. 4, the scanner comprises a first image sensing module having a first CCD 10 and a first lens 12 with a third optical angle, a second image sensing module having a second CCD 10' and a second lens 12' with a forth optical angle, a platform 14, and a light source 16. The third optical angle is defined as the angle between the normal of document and the direction of optical path from the light source 16 to the first CCD 10. The fourth optical angle is defined as the angle between the normal of document and the direction of optical path from the light source 16 to the second CCD 10'. The transparent document to be scanned is placed on the platform 14. The auxiliary image is not projected correctly on the second image sensing module since the fourth optical angle is small. Only those image diffused or scattered by scratched area on the document will project clearly on the second image sensing module. This scanner captures the primary image with the primary image sensing module and captures the auxiliary image with the second image sensing module at the same time. Then the scanner outputs those image data to the connected host. After receiving both primary and auxiliary image data, the host will pre-process the auxiliary image data to generate a reference image with only the scratched area. Then, the host corrects the primary image according to the reference image by a correction procedure to form a higher quality image. Of course, the image processing features can also be built into the scanning device and provide the final result to the host instead. Plus, the advantage of this case is that it can obtain both primary and auxiliary image data at the same time to save the scanning time.

Figure 5:
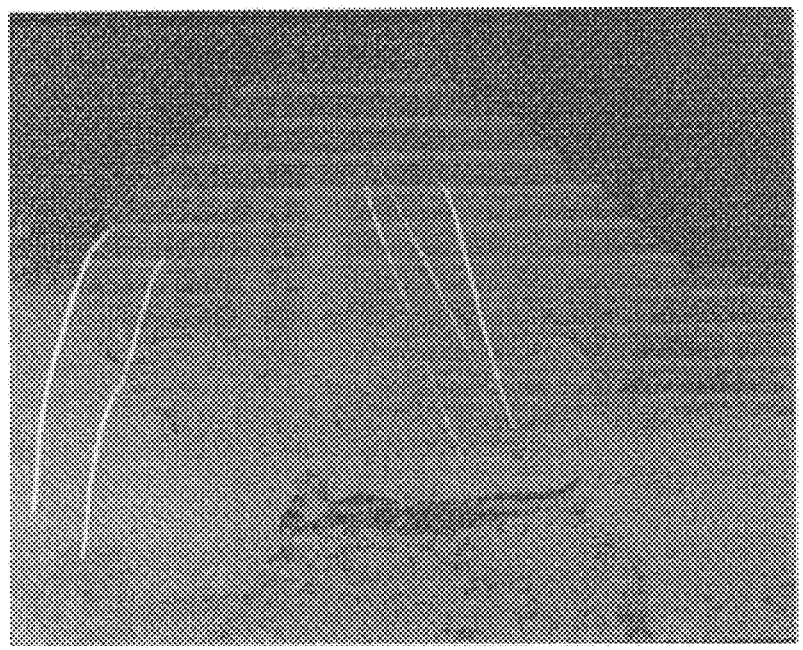
FIG. 5 is the image captured by a typical scanner.
Figure 6:
FIG. 6 is the damaged image captured by a scanner implemented with this invention.
Figure 7:
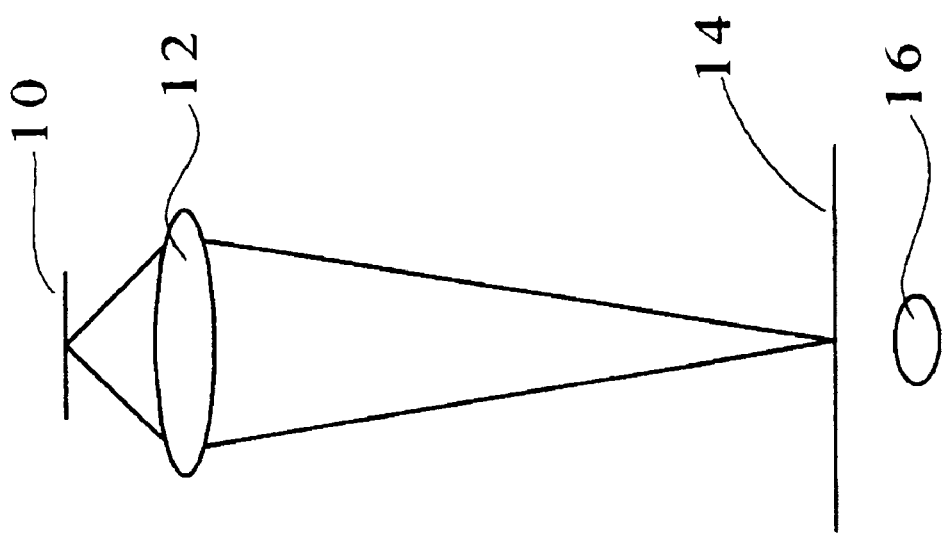
FIG. 7 is the optical diagram for typical transparent scanner.
Figure 8:
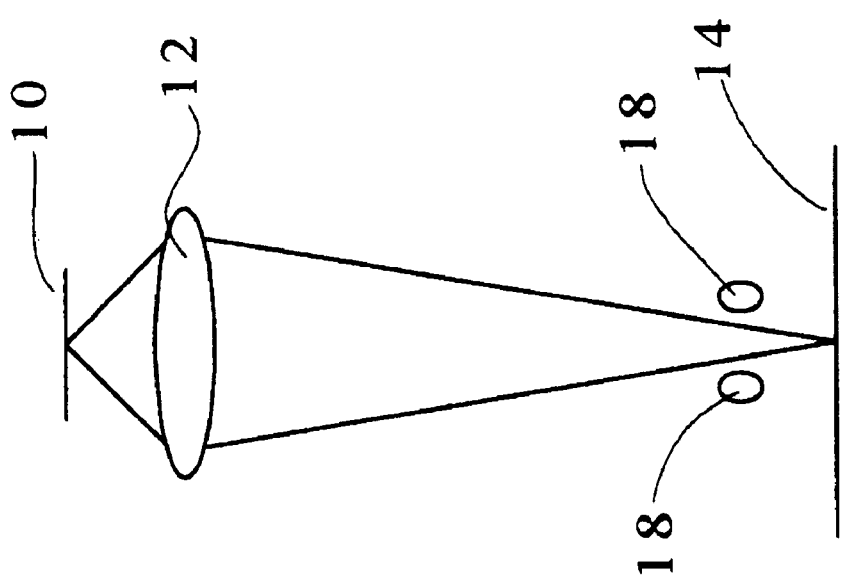
FIG. 8 is the optical diagram for typical reflective scanner.

FIGS. 5 and 6 show the primary and auxiliary image data by the scanner implemented with this invention. The primary data is as same as the image generated by a typical scanner. The auxiliary image is generated by this invention. It can be understood by viewing FIG. 5 that the scratched area on the document will also appear on the image obtained by typical scanners from scanning the scratched documents and the higher quality image can't be obtained. Using the auxiliary image, like the image in FIG. 6, the scratched on the primary image can be removed from the primary image by applying image processing functions according to the auxiliary image, therefore the scanner corrects the primary image.

The examples mentioned above are used to explain the contents of this invention. But, they do not limit the application coverage for this invention. Users can make any forms of changes relating to the applications for this invention as long as the major principle of this invention remains. For instance, users can apply only one light source with a moving mechanism to move the light source to both the primary and auxiliary scanning locations.

What is claimed is:

1. An image scanner with an image correction function, comprising:
    a housing with a scanning platform for placing a document to be scanned;
    a major light source arranged to illuminate said document at a first optical angle;
    an auxiliary light source arranged to illuminate said document at a second optical angle different than said first optical angle, said major light source and said auxiliary light source being further arranged to alternately illuminate said document; and
    a scanning module arranged to capture a primary image while said major light source illuminates said document and to capture an auxiliary image that includes information concerning damage to the document while said auxiliary light source illuminates said document.

2. The scanner as recited in claim 1, wherein said primary image and said auxiliary image are output to a host to correct portions of said primary image that also include said damage information according to said auxiliary image.

3. The scanner as recited in claim 1, further comprising a correction means for correcting portions of said primary image that also includes said damage information according to said auxiliary image.

4. The scanner as recited in claim 1, wherein said first optical angle is defined as an angle between a normal of said document and an illuminating direction from said primary light source to said document.

5. The scanner as recited in claim 1, wherein said second optical angle is defined as an angle between a normal of said document and an illuminating direction from said auxiliary light source to said document.

6. The scanner as recited in claim 1, wherein said second optical angle is larger than said first optical angle.

7. An image scanner with an image correction function, comprising:
    a housing with a scanning platform for placing a document to be scanned;
    a light source arranged to illuminate said document;
    a moving module to move said light source to a first position and to a second position different than said first position;
    a scanning module arranged to capture a primary image while said light source illuminates said document when said light source is at said first position and to capture an auxiliary image that includes information concerning damage to said document while said light source illuminates said document at said second position.

8. The scanner as recited in claim 7, wherein said primary image and said auxiliary image are output to a host to correct portions of said primary image that also include said damage information according to said auxiliary image.

9. The scanner as recited in claim 7, further comprising a correction means for correcting portions of said primary image that also includes said damage information according to said auxiliary image.

10. The scanner as recited in claim 7, wherein said first optical angle is defined as an angle between a normal of said document and an illuminating direction from said primary light source to said document.

11. The scanner as recited in claim 7, wherein said second optical angle is defined as an angle between a normal of said document and an illuminating direction from said auxiliary light source to said document.

12. The scanner as recited in claim 7, wherein said second optical angle is larger than said first optical angle.

13. An image scanner with an image correction function, comprising:

a housing with a platform for placing a document to be scanned;

a light source for illuminating said document;

a primary image sensing module arranged to generate a primary image with a first optical angle;

an auxiliary imaging sensing module arranged to generate an auxiliary image with a second optical angle, said auxiliary image including information concerning damage to said document; and a movable carriage for carrying said primary image sensing module and said auxiliary image sensing module and for causing said primary image sensing module and said auxiliary image sensing module to reciprocate, thereby causing said primary image sensing module and said auxiliary image sensing module to alternately capture said image.

14. The scanner as recited in claim 13, wherein said primary image and said auxiliary image are output to a host to correct portions of said primary image that also include said damage information according to said auxiliary image.

15. The scanner as recited in claim 13, further comprising a correction means for correcting portions of said primary image that also includes said damage information according to said auxiliary image.

16. The scanner as recited in claim 13, wherein said first optical angle is defined as an angle between a normal of said document and an illuminating direction from said primary light source to said document.

17. The scanner as recited in claim 13, wherein said second optical angle is defined as an angle between a normal of said document and an illuminating direction from said auxiliary light source to said document.

18. The scanner as recited in claim 13, wherein said second optical angle is larger than said first optical angle.

* * * * *